(12) United States Patent
Oko

(10) Patent No.: US 11,599,971 B2
(45) Date of Patent: Mar. 7, 2023

(54) IMAGE PROCESSING DEVICE

(71) Applicant: SUBARU CORPORATION, Tokyo (JP)

(72) Inventor: Akitaka Oko, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 330 days.

(21) Appl. No.: 16/993,571

(22) Filed: Aug. 14, 2020

(65) Prior Publication Data

US 2021/0104020 A1 Apr. 8, 2021

(30) Foreign Application Priority Data

Oct. 2, 2019 (JP) .............................. JP2019-182067

(51) Int. Cl.
| | |
|---|---|
| *G06T 3/60* | (2006.01) |
| *H04N 13/106* | (2018.01) |
| *G06T 19/00* | (2011.01) |
| *H04N 13/239* | (2018.01) |

(52) U.S. Cl.
CPC ................ *G06T 3/60* (2013.01); *G06T 19/00* (2013.01); *H04N 13/106* (2018.05); *G06T 2219/2016* (2013.01); *H04N 13/239* (2018.05)

(58) Field of Classification Search
None
See application file for complete search history.

(56) References Cited

U.S. PATENT DOCUMENTS 6,373,518 B1* 4/2002 Sogawa .................. G06T 5/006
348/E13.016
2021/0329171 A1* 10/2021 Himukashi .......... H04N 13/106

FOREIGN PATENT DOCUMENTS

JP 2015-175635 A 10/2015

* cited by examiner

*Primary Examiner* — Yi Wang
(74) *Attorney, Agent, or Firm* — McDermott Will & Emery LLP

(57) ABSTRACT

An image processing device includes a rotation processor, a parallax image generator, and a rotation controller. The rotation processor makes rotation processing including rotating first left and right images in a stereo image, to generate second left and right images. The parallax image generator calculates corresponding left and right image points in the second left and right images, to generate a parallax image. The rotation controller obtains a coordinate point to calculate an amount of angular change in a rotation angle in the rotation processing. The coordinate point indicates relation of a first positional difference in a horizontal direction and a second positional difference in a vertical direction, between first and second positions. The first and second positions are respective positions of the left and right image points in the second left and right images.

7 Claims, 7 Drawing Sheets

IMAGE PROCESSING DEVICE

CROSS-REFERENCE TO RELATED APPLICATIONS

This application claims priority from Japanese Patent Application No. 2019-182067 filed on Oct. 2, 2019, the entire contents of which are hereby incorporated by reference.

BACKGROUND

The disclosure relates to an image processing device that obtains a parallax image on the basis of a stereo image.

Some vehicles such as automobiles generate a parallax image on the basis of a stereo image obtained by a stereo camera. The parallax image includes parallax-related information. For example, Japanese Unexamined Patent Application Publication (JP-A) No. 2015-175635 describes a distance estimation device. The distance estimation device generates a parallax image by calculating an amount of positional deviation between right and left image sensors with the use of monocular motion stereo, and making a correction of a captured image on the basis of the amount of positional deviation.

SUMMARY

An aspect of the technology provides an image processing device including a rotation processor, a parallax image generator, and a rotation controller. The rotation processor is configured to make rotation processing including rotating a first left image and a first right image included in a stereo image, to generate a second left image and a second right image. The parallax image generator is configured to calculate, on the basis of the second left image and the second right image, a left image point in the second left image and a right image point in the second right image, to generate a parallax image. The left image point and the right image point correspond to each other. The rotation controller is configured to obtain a coordinate point, to calculate, on the basis of the coordinate point, an amount of angular change in a rotation angle in the rotation processing. The coordinate point indicates relation of a first positional difference in a horizontal direction and a second positional difference in a vertical direction, between a first position and a second position. The first position is a position of the left image point in the second left image. The second position is a position of the right image point in the second right image.

An aspect of the technology provides an image processing device including circuitry. The circuitry is configured to make rotation processing including rotating a first left image and a first right image included in a stereo image, to generate a second left image and a second right image. The circuitry is configured to calculate, on the basis of the second left image and the second right image, a left image point in the second left image and a right image point in the second right image, to generate a parallax image. The left image point and the right image point correspond to each other. The circuitry is configured to obtain a coordinate point, to calculate, on the basis of the coordinate point, an amount of angular change in a rotation angle in the rotation processing. The coordinate point indicates relation of a first positional difference in a horizontal direction and a second positional difference in a vertical direction, between a first position and a second position. The first position is a position of the left image point in the second left image. The second position is a position of the right image point in the second right image.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
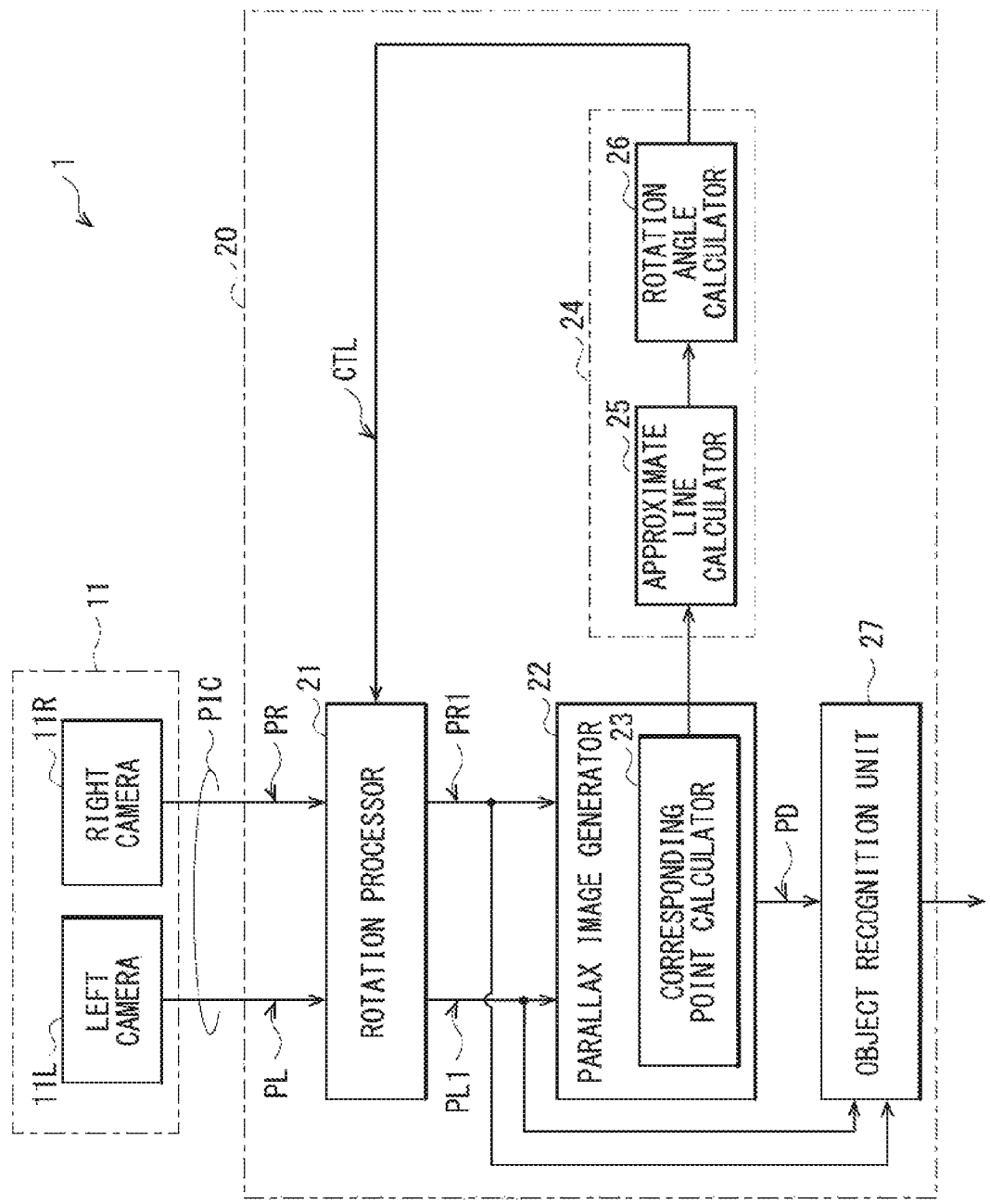
FIG. 1 is a block diagram illustrating a configuration example of an image processing device according to an embodiment of the disclosure.

For image processing devices, high precision of parallax images is desired, with expectation for more enhanced precision.

It is desirable to provide an image processing device that makes it possible to enhance precision of parallax images.

In the following, some embodiments of the disclosure are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a dimension of each of the elements, a material of each of the elements, a ratio between the elements, relative positional relationship between the elements, and any other specific numerical value are illustrative only and not to be construed as limiting to the technology. Further, elements in the following example embodiments which are not recited in a most-generic independent claim of the disclosure are optional and may be provided on an as-needed basis. Throughout the specification and the drawings, elements having substantially the same function and configuration are denoted with the same reference characters to avoid redundant description, and elements not in direct relation to the technology may not be illustrated.

Embodiments

Configuration Example

FIG. 1 illustrates a configuration example of an image processing device, e.g., an image processing device 1, according to an embodiment. The image processing device 1 may include a stereo camera 11 and a processor 20. The image processing device 1 may be mounted on a vehicle 10 such as an automobile.

The stereo camera 11 is configured to capture an image frontward of the vehicle 10, to generate a pair of images having parallax with respect to each other, e.g., a left image PL and a right image PR. The stereo camera 11 may include a left camera 11L and a right camera 11R. The left camera 11L and the right camera 11R may each include a lens and an image sensor. In this example, the left camera 11L and the right camera 11R may be disposed near an upper part of a front windshield of the vehicle 10, in vehicle interior of the vehicle 10. The left camera 11L and the right camera 11R may be spaced apart at a predetermined distance in a widthwise direction of the vehicle 10. The left camera 11L and the right camera 11R may perform imaging operation in synchronization with each other. The left camera 11L may generate the left image PL, and the right camera 11R may generate the right image PR. The left image PL and the right image PR may constitute a stereo image PIC. The stereo camera 11 may perform the imaging operation at a predetermined frame rate, e.g., 60 [fps], to generate a sequence of the stereo images PIC.

Figure 2:
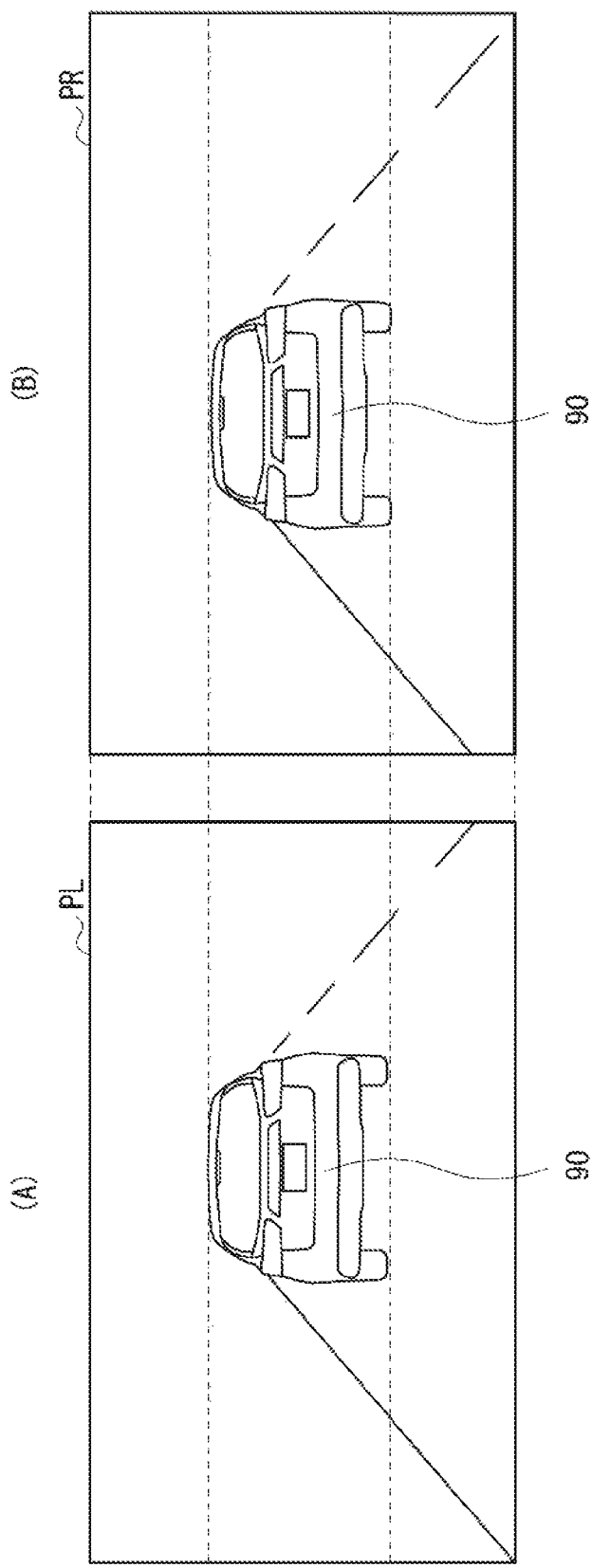
FIG. 2 illustrates an example of a left image and a right image generated by a stereo camera illustrated in FIG. 1.

FIG. 2 illustrates an example of the stereo image PIC. Part (A) of FIG. 2 illustrates an example of the left image PL, and part (B) of FIG. 2 illustrates an example of the right image PR. In this example, a surrounding vehicle, or a preceding vehicle 90, is traveling ahead of the vehicle 10 on a road traveled by the vehicle 10. The left camera 11L may capture an image of the preceding vehicle 90 to generate the left image PL. The right camera 11R may capture an image of the preceding vehicle 90 to generate the right image PR. The stereo camera 11 may generate the stereo image PIC including the left image PL and the right image PR as described.

The processor 20 is configured to recognize an object ahead of the vehicle 10, on the basis of the stereo image PIC supplied from the stereo camera 11. In the vehicle 10, for example, on the basis of information regarding the object recognized by the processor 20, for example, a travel control of the vehicle 10 may be made, or alternatively, the information regarding the object recognized may be displayed on a console monitor. The processor 20 may include, for example, a CPU (Central Processing Unit), a RAM (Random Access Memory), and a ROM (Read Only Memory). The CPU may execute programs. The RAM may temporarily hold processed data. The ROM may hold the programs. The processor 20 may include a rotation processor 21, a parallax image generator 22, a rotation controller 24, and an object recognition unit 27.

The rotation processor 21 is configured to make rotation processing on the basis of rotation control data CTL, to generate a left image PL1 and a right image PR1. The rotation processing includes rotating the left image PL and the right image PR included in the stereo image PIC. The rotation control data CTL may be supplied from the rotation controller 24.

For example, in the processor 20, as described later, the parallax image generator 22 may detect a corresponding point on the basis of the left image PL (the left image PL1) and the right image PR (the right image PR1), to generate a parallax image PD. On the occasion of the generation of the parallax image PD by the parallax image generator 22, as illustrated in FIG. 2, it is desirable that positions in a vertical direction of the images of the preceding vehicle 90 in the left image PL and the right image PR are substantially in registry. However, in the stereo camera 11, there may be cases where the left camera 11L and the right camera 11R are disposed in relatively deviated relation in, for example, a heightwise direction.

Figure 3:
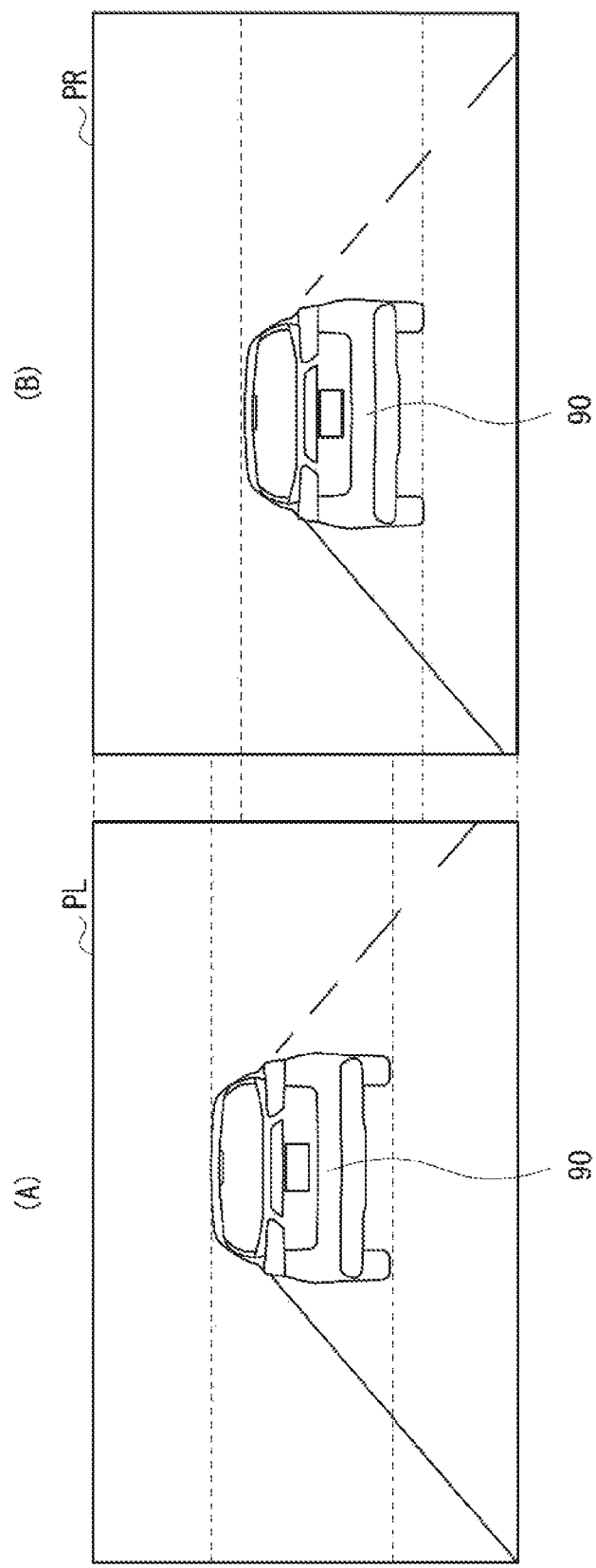
FIG. 3 illustrates another example of the left image and the right image generated by the stereo camera illustrated in FIG. 1.

FIG. 3 illustrates an example of the stereo image PIC in a case where the position of the left camera 11L is lower than the position of the right camera 11R. Part (A) of FIG. 3 illustrates an example of the left image PL, and part (B) of FIG. 3 illustrates an example of the right image PR. In such a case where the position of the left camera 11L is lower than the position of the right camera 11R, as illustrated in FIG. 3, the position of the image of the preceding vehicle 90 in the left image PL becomes higher than the position of the image of the preceding vehicle 90 in the right image PR. Meanwhile, in a case where the position of the left camera 11L is higher than the position of the right camera 11R, in contrast to the case of FIG. 3, the position of the image of the preceding vehicle 90 in the left image PL becomes lower than the position of the image of the preceding vehicle 90 in the right image PR. As described, in the case where the left camera 11L and the right camera 11R are disposed in the relatively deviated relation in the heightwise direction, the positions in the vertical direction of the images of the preceding vehicle 90 in the left image PL and the right image PR are also deviated from each other.

Such deviation of the positions in the vertical direction of the images of the preceding vehicle 90 in the left image PL and the right image PR may prevent the parallax image generator 22 from detecting the corresponding point related to the preceding vehicle 90 on the basis of the left image PL and the right image PR. This may result in lowered precision of the parallax image PD. Thus, in the image processing device 1, the rotation processor 21 rotates the left image PL and the right image PR, in the same direction of rotation, by the same rotation angle θ, on the basis of the rotation control data CTL, to generate the left image PL1 and the right image PR1. On the basis of the left image PL1 and the right image PR1, the parallax image generator 22 detects the corresponding point.

Figure 4:
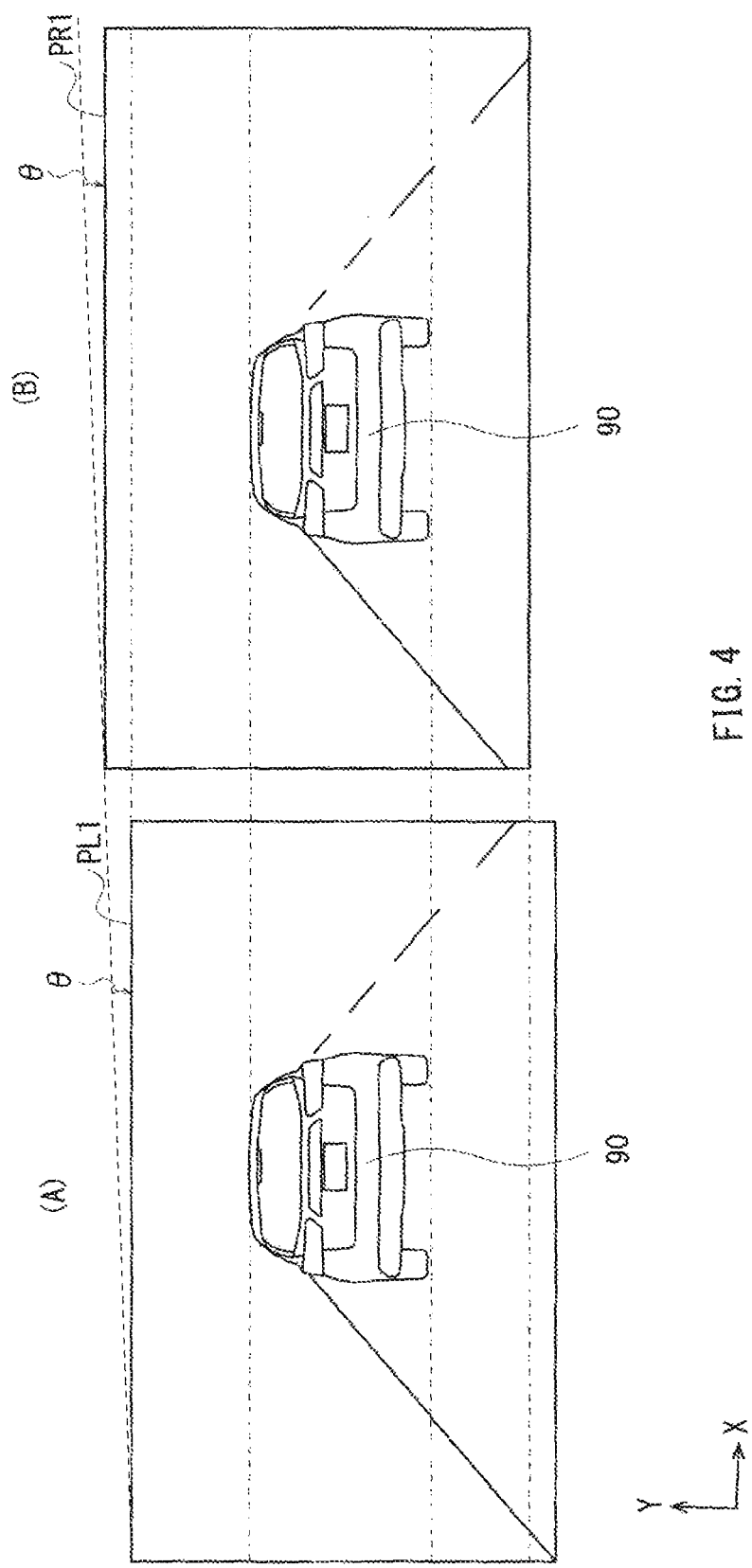
FIG. 4 illustrates an operation example of a rotation processor illustrated in FIG. 1.

Part (A) of FIG. 4 illustrates the left image PL1 generated by the rotation processor 21, and part (B) of FIG. 4 illustrates the right image PR1 generated by the rotation processor 21. In this example, as illustrated in FIG. 3, the position of the image of the preceding vehicle 90 in the left image PL is higher than the position of the image of the preceding vehicle 90 in the right image PR. In this case, as illustrated in FIG. 4, the rotation processor 21 rotates the left image PL and the right image PR clockwise by the rotation angle θ, to generate the left image PL and the right image PR. Allowing the rotation processor 21 to make such rotation processing makes it possible to bring substantially into registry the positions in the vertical direction, i.e., a Y direction, of the images of the preceding vehicle 90 in the left image PL1 and the right image PR1. It is to be noted that for example, in contrast to the case of FIG. 3, in the case where the position of the image of the preceding vehicle 90 in the left image PL is lower than the position of the image of the preceding vehicle 90 in the right image PR, the rotation processor 21 rotates the left image PL and the right image PR counterclockwise, making it possible to bring substantially into registry the positions in the vertical direction, i.e., the Y direction, of the images of the preceding vehicle 90 in the left image PL1 and the right image PR1. Hence, it is possible for the parallax image generator 22 to make detection of the corresponding point on the basis of the left image PL1 and the right image PR1, and on the basis of a result of the detection, to generate the parallax image PD.

The parallax image generator 22 (FIG. 1) is configured to make predetermined image processing on the basis of the left image PL1 and the right image PR1 generated by the rotation processor 21, to generate the parallax image PD. Non-limiting examples of the predetermined image processing may include a stereo matching process and a filtering process. The parallax image PD may include a plurality of pixel values. Each of the plurality of pixel values may indicate a parallax-related value in each pixel. In other words, each of the plurality of pixel values may correspond to a distance, in three-dimensional real space, to a point corresponding to each pixel.

The parallax image generator 22 may include a corresponding point calculator 23. The corresponding point calculator 23 may perform, on the basis of the left image PL1 and the right image PR1, a matching process in units of each of a plurality of separated sub-regions S, to specify a corresponding point CP including two image points that correspond to each other. In one example, the corresponding point calculator 23 may search a plurality of sub-regions SL in the left image PL1 and a plurality of sub-regions SR in the right image PR1, for sub-regions SL and SR having similar image patterns, to specify, as the corresponding point CP, a left image point CPL and a right image point CPR that correspond to each other. The corresponding point calculator 23 may specify the corresponding point CP by, for example, template matching, or alternatively, the corresponding point calculator 23 may specify the corresponding point CP by feature matching based on local features.

Figure 5:
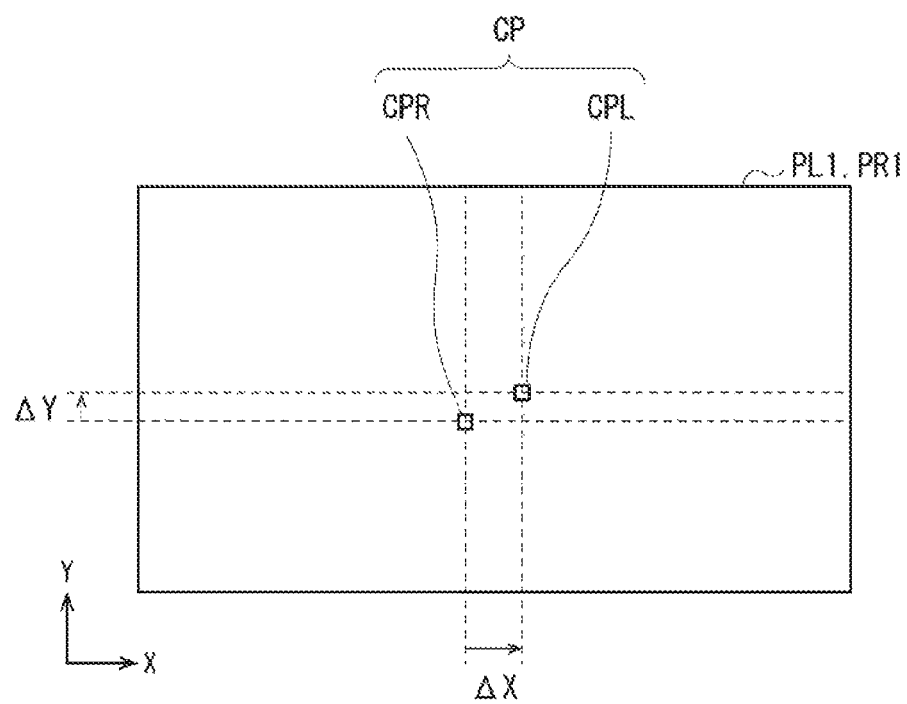
FIG. 5 illustrates an example of a left image point and a right image point related to a corresponding point calculated by a corresponding point calculator illustrated in FIG. 1.

FIG. 5 illustrates an example of the left image point CPL and the right image point CPR that constitute the single corresponding point CP. In FIG. 5, the left image point CPL in the left image PL1 and the right image point CPR in the right image PR1 are illustrated in superimposed relation. In this example, as illustrated in FIG. 3, the position of the image of the preceding vehicle 90 in the left image PL is higher than the position of the image of the preceding vehicle 90 in the right image PR. Moreover, the rotation angle θ is zero (0) degree and is not set at an appropriate angle. Accordingly, a coordinate position of the left image point CPL in the left image PL1 and a coordinate position of the right image point CPR in the right image PR1 are deviated from each other. In this example, the coordinate position of the left image point CPL is deviated by a coordinate difference ΔX in an X direction and deviated by a coordinate difference ΔY in the Y direction, with the coordinate position of the right image point CPR as a reference.

The coordinate difference ΔX corresponds to, for example, parallax in the left image PL1 and the right image PR1. That is, in a case with a small distance to a subject related to the corresponding point CP, the coordinate difference ΔX becomes greater. In a case with a great distance to the subject, the coordinate difference ΔX becomes smaller.

The coordinate difference ΔY corresponds to a difference between positions in the vertical direction, i.e., the Y direction, of the images of the subject related to the corresponding point CP in the left image PL1 and the right image PR1. In this example, as illustrated in FIG. 3, the position of the image of the subject in the left image PL is higher than the position of the image of the subject in the right image PR, and therefore, the coordinate difference ΔY is positive. For example, in contrast to the case of FIG. 3, in the case where the position of the image of the subject in the left image PL is lower than the position of the image of the subject in the right image PR, the coordinate difference ΔY is negative. Moreover, in the case where the rotation angle θ is not set at the appropriate angle, an absolute value of the coordinate difference ΔY becomes greater as the distance to the subject is smaller. The absolute value of the coordinate difference ΔY becomes smaller as the distance to the subject is greater.

The rotation controller 24 is configured to calculate, on the basis of data regarding the corresponding point CP calculated by the corresponding point calculator 23, the rotation angle θ in the rotation processing of the rotation processor 21, to generate the rotation control data CTL. The rotation control data CTL instructs the rotation processor 21 to make the rotation processing. The rotation controller 24 may include an approximate line calculator 25 and a rotation angle calculator 26.

The approximate line calculator 25 is configured to obtain a coordinate point P, to calculate, on the basis of the coordinate point P, an approximate line LIN regarding the coordinate point P. The coordinate point P indicates relation of the coordinate difference ΔX in a horizontal direction, i.e., the X direction, and the coordinate difference ΔY in the vertical direction, i.e., the Y direction, between the coordinate position of the left image point CPL in the left image PL1 and the coordinate position of the right image point CPR in the right image PR1.

The rotation angle calculator 26 is configured to calculate, on the basis of the approximate line LIN calculated by the approximate line calculator 25, an amount of angular change Δθ from the current rotation angle θ, and add the amount of angular change Δθ to the current rotation angle θ to calculate the rotation angle θ. Moreover, the rotation angle calculator 26 may calculate the rotation control data CTL including data regarding the rotation angle θ calculated.

The object recognition unit 27 is configured to make recognition of an object ahead of the vehicle 10, on the basis of the left image PL1 and the right image PR1, and on the basis of the parallax image PD generated by the parallax image generator 22. Moreover, the object recognition unit 27 may output data regarding a result of the recognition.

With this configuration, in the image processing device 1, the rotation processor 21 makes the rotation processing on the basis of the rotation control data CTL, to generate the left image PL1 and the right image PR1. The rotation processing includes rotating the left image PL and the right image PR. The parallax image generator 22 generates the parallax image PD on the basis of the left image PL1 and the right image PR1. The rotation controller 24 generates the rotation control data CTL on the basis of the data regarding the corresponding point CP calculated by the corresponding point calculator 23 of the parallax image generator 22. Thus, in the image processing device 1, for example, it is possible to adjust the rotation angle θ, to bring substantially into registry the positions in the heightwise direction, i.e., Y coordinates, of the images of the preceding vehicle 90 in the left image PL1 and the right image PR1. It is possible for the parallax image generator 22 to detect the corresponding point CP on the basis of the left image PL1 and the right image PR1 as described. As a result, in the image processing device 1, it is possible to enhance precision of the parallax image PD.

In one embodiment of the disclosure, the rotation processor 21 may serve as a "rotation processor". In one embodiment of the disclosure, the parallax image generator 22 may serve as a "parallax image generator". In one embodiment of the disclosure, the rotation controller 24 may serve as a "rotation controller". In one embodiment of the disclosure, the stereo image PIC may serve as a "stereo image". In one embodiment of the disclosure, the left image PL may serve as a "first left image". In one embodiment of the disclosure, the right image PR may serve as a "first right image". In one embodiment of the disclosure, the left image PL1 may serve as a "second left image". In one embodiment of the disclosure, the right image PR1 may serve as a "second right image". In one embodiment of the disclosure, the left image point CPL may serve as a "left image point". In one embodiment of the disclosure, the right image point CPR may serve as a "right image point". In one embodiment of the disclosure, the coordinate difference ΔX may serve as a "first positional difference". In one embodiment of the disclosure, the coordinate difference ΔY may serve as a "second positional difference". In one embodiment of the disclosure, the rotation angle θ may serve as a "rotation angle". In one embodiment of the disclosure, the amount of angular change Δθ may serve as an "amount of angular change". In one embodiment of the disclosure, the approximate line LIN may serve as an "approximate line".

Operation and Workings

Description now moves on to operation and workings of the image processing device 1 according to the embodiment.

Summary of Overall Operation

First, summary of overall operation of the image processing device 1 is described with reference to FIG. 1. The stereo camera 11 captures an image frontward of the vehicle 10, to generate the stereo image PIC including the left image PL and the right image PR. In the processor 20, the rotation processor 21 makes the rotation processing on the basis of the rotation control data CTL, to generate the left image PL1 and the right image PR1. The rotation processing includes rotating the left image PL and the right image PR included in the stereo image PIC. The parallax image generator 22 makes the predetermined image processing on the basis of the left image PL1 and the right image PR1 generated by the rotation processor 21, to generate the parallax image PD. Non-limiting examples of the predetermined image processing may include the stereo matching process and the filtering process. The rotation controller 24 calculates, on the basis of the data regarding the corresponding point CP calculated by the corresponding point calculator 23 of the parallax image generator 22, the rotation angle θ in the rotation processing of the rotation processor 21, to generate the rotation control data CTL. The rotation control data CTL instructs the rotation processor 21 to make the rotation processing. The object recognition unit 27 recognizes the object ahead of the vehicle 10 on the basis of the left image PL1 and the right image PR1, and on the basis of the parallax image PD generated by the parallax image generator 22.

Detailed Operation

The rotation controller 24 calculates the rotation angle θ in the rotation processing of the rotation processor 21, on the basis of the data regarding the corresponding point CP calculated by the corresponding point calculator 23 of the parallax image generator 22. In one example, the approximate line calculator 25 obtains the coordinate point P on the basis of the data regarding the corresponding point CP, to calculate, on the basis of the coordinate point P, the approximate line LIN regarding the coordinate point P. The coordinate point P indicates the relation of the coordinate difference ΔX in the horizontal direction, i.e., the X direction, and the coordinate difference ΔY in the vertical direction, i.e., the Y direction, between the coordinate position of the left image point CPL in the left image PL1 and the coordinate position of the right image point CPR in the right image PR1. Thus, the rotation angle calculator 26 calculates the amount of angular change Δθ from the current rotation angle θ on the basis of the approximate line LIN calculated by the approximate line calculator 25, and to add the amount of angular change Δθ to the current rotation angle θ to calculate the rotation angle θ. In the following, operation of the rotation controller 24 is described in detail.

Figure 6:
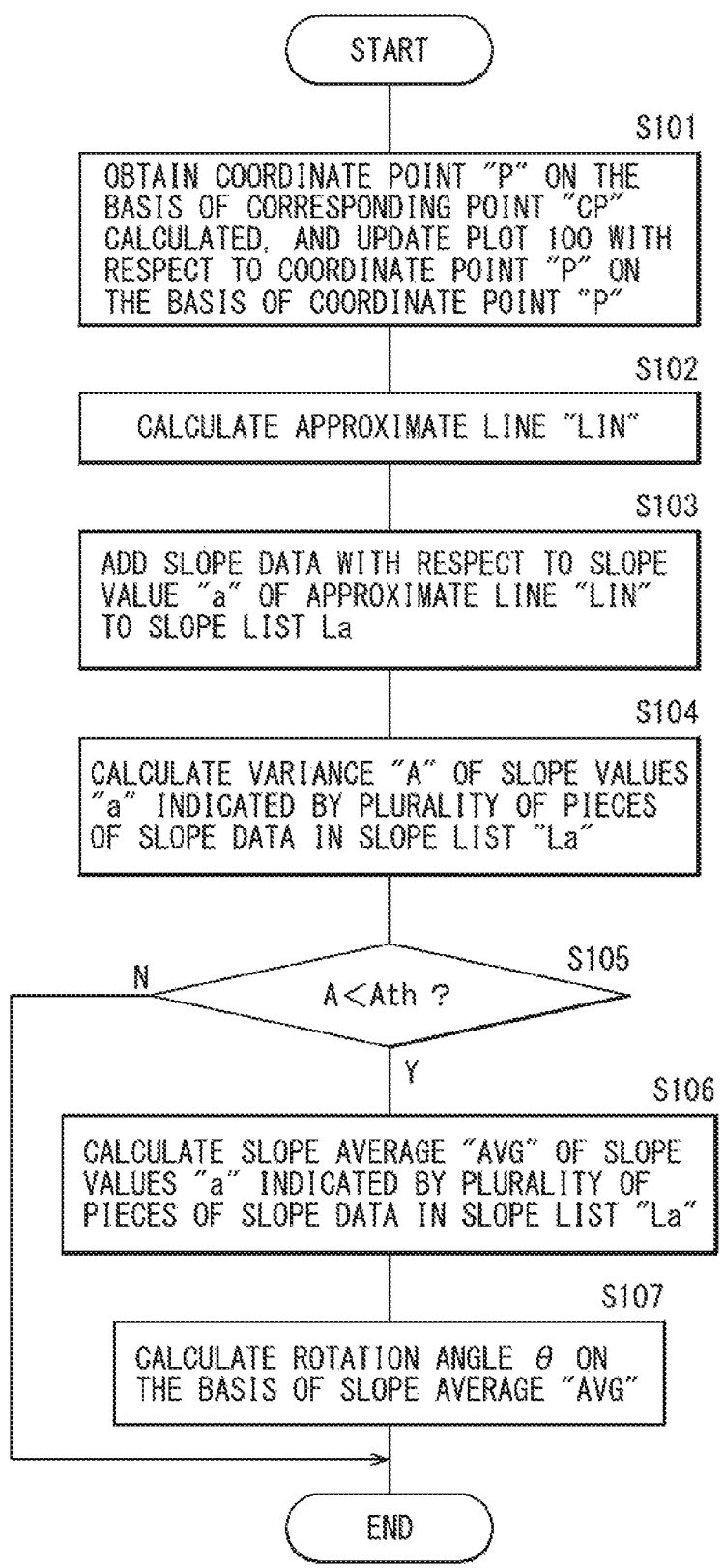
FIG. 6 is a flowchart of an operation example of a rotation controller illustrated in FIG. 1.

FIG. 6 illustrates an operation example of the rotation controller 24. In this example, each time the corresponding point CP is calculated by the corresponding point calculator 23, the rotation controller 24 may calculate the approximate line LIN on the basis of the data regarding the relevant corresponding point CP. Moreover, the rotation angle calculator 26 may calculate the rotation angle θ on the basis of the approximate line LIN calculated by the approximate line calculator 25. In the following, this operation is described in detail.

First, the approximate line calculator 25 may obtain the coordinate point P on the basis of the data regarding the corresponding point CP, and update a plot 100 regarding the coordinate point P on the basis of the coordinate point P (step S101). In one example, the approximate line calculator 25 may obtain the coordinate point P that indicates the relation of the coordinate difference ΔX in the horizontal direction, i.e., the X direction, and the coordinate difference ΔY in the vertical direction, i.e., the Y direction, between the coordinate position of the left image point CPL in the left image PL1 and the coordinate position of the right image point CPR in the right image PR1. Thus, the approximate line calculator 25 may record the coordinate point P calculated, on the plot 100, to update the plot 100. On the plot 100, a plurality of the coordinate points P previously calculated are recorded.

Figure 7:
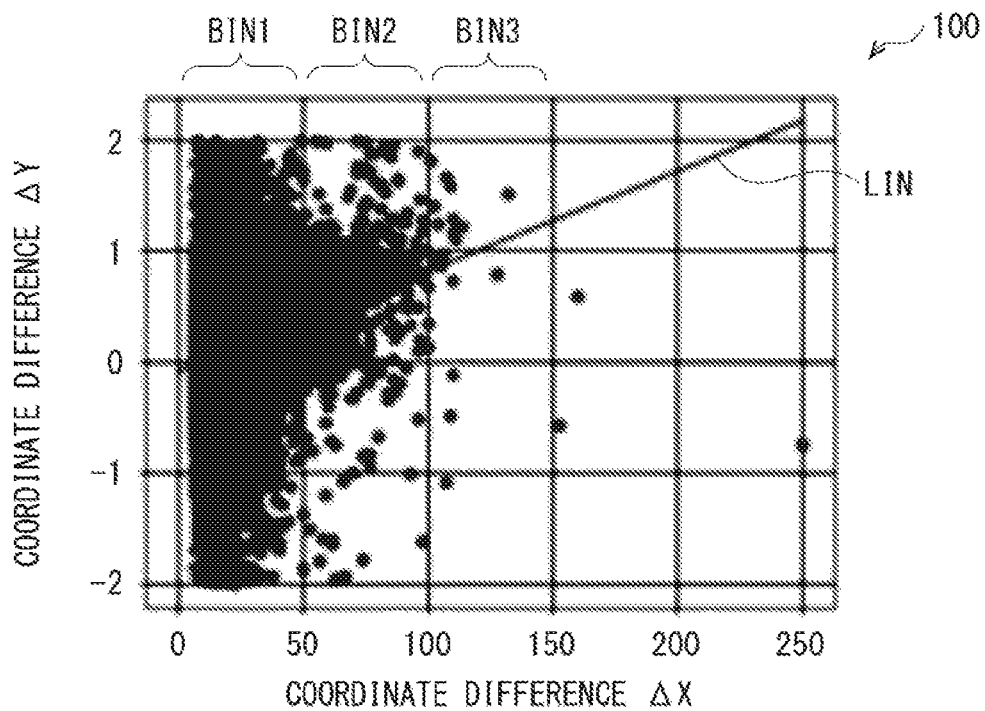
FIG. 7 illustrates an operation example of the rotation controller illustrated in FIG. 1.

FIG. 7 illustrates a configuration example of the plot 100. In the plot 100, a horizontal axis denotes the coordinate difference ΔX, and a vertical axis denotes the coordinate difference ΔY. In FIG. 7, the dots indicate the coordinate points P. A plurality of the coordinate points P may be calculated on the basis of, for example, a plurality of the stereo images PIC generated by the stereo camera 11 after an engine start of the vehicle 10. In this example, there is an upper limit on the number of the coordinate points P to be recorded on the plot 100. In a case where the coordinate point P is newly calculated when the number of the coordinate points P reaches the upper limit, the oldest one of the coordinate points P is eliminated from the plot 100, and the newly calculated coordinate point P is added to the plot 100. In this example, the plot 100 is divided into a plurality of regions BIN in the direction of the horizontal axis, e.g., three regions BIN1 to BIN3 in this example. In one example, the region BIN1 is a region in which the coordinate difference ΔX ranges from zero (0) inclusive to 50 exclusive. The region BIN2 is a region in which the coordinate difference ΔX ranges 50 inclusive to 100 exclusive. The region BIN3 is a region in which the coordinate difference ΔX ranges from 100 inclusive to 150 exclusive.

Thereafter, the approximate line calculator 25 may calculate the approximate line LIN on the basis of the plurality of the coordinate points P on the plot 100 (step S102). In one example, the approximate line calculator 25 may calculate a center of gravity of the coordinate points P in each of the plurality of the regions BIN. In one example, the approximate line calculator 25 may calculate the center of gravity of the plurality of the coordinate points P that belong to the region BIN1, calculate the center of gravity of the plurality of the coordinate points P that belong to the region BIN2, and calculate the center of gravity of the plurality of the coordinate points P that belong to the region BIN3. Thus, the approximate line calculator 25 may calculate the approximate line LIN by the least-squares method on the basis of the center of gravity of each of the plurality of the regions BIN. In one example, the approximate line calculator 25 may calculate, for example, a slope value a and an intercept value b in a linear function given by the following equation EQ1, by the least-squares method.

$$\Delta Y = a \times \Delta X + b \ldots \quad \text{(EQ1)}$$

In this way, the approximate line calculator 25 may calculate the approximate line LIN. It is to be noted that in this example, the slope value a and the intercept value b are calculated by the least-squares method, but this is non-limiting. Instead, for example, the intercept value b may be assumed to be zero (0), and solely the slope value a may be calculated by the least-squares method.

It is to be noted that in this example, the approximate line calculator 25 calculates the center of gravity in each of the plurality of the regions BIN on the basis of the plurality of the coordinate points P on the plot 100, to calculate the approximate line LIN on the basis of the centers of gravity, but this is non-limiting. Instead, for example, the approximate line calculator 25 may directly calculate the approximate line LIN by the least-squares method on the basis of the plurality of the coordinate points P on the plot 100. In this case, the approximate line calculator 25 may calculate the approximate line LIN by, for example, weighted least-squares method. In one example, weight-setting as to any coordinate point P may be provided in accordance with the number of the coordinate points P in the region BIN to which the relevant coordinate point P belongs. For example, in a case where the number of the coordinate points P in any region BIN is great, any coordinate point P that belongs to the relevant region BIN may be lightly weighted. In a case where the number of the coordinate points P in any region BIN is small, any coordinate point P that belongs to the relevant region BIN may be heavily weighted.

FIG. 7 illustrates an example of the approximate line LIN calculated. In this example of FIG. 7, the slope value a of the approximate line LIN is positive. As the coordinate difference ΔX is greater, the coordinate difference ΔY becomes greater. As the coordinate difference ΔX is smaller, the coordinate difference ΔY becomes smaller and comes close to zero (0). In other words, as the distance to the subject related to the corresponding point CP is small, the absolute value of the coordinate difference ΔY becomes greater. As the distance to the subject is greater, the coordinate difference ΔY becomes smaller. This indicates that the positions in the vertical direction of the images of the subject in the left image PL1 and the right image PR1 are deviated, and indicates that the rotation angle θ has not yet been adjusted at the appropriate angle.

Thereafter, the rotation angle calculator 26 may add data regarding the slope value a of the approximate line LIN, or slope data, to a slope list La (step S103). The slope list La is configured to accumulate the predetermined number of pieces of the slope data. There is an upper limit on the number of pieces of the slope data the slope list La is configured to accumulate. In a case where the approximate line LIN is newly calculated when the number of pieces of the slope data reaches the upper limit, the oldest piece of the slope data is eliminated from the slope list La, and the slope data regarding the newly calculated approximate line LIN is added to the slope list La.

Thereafter, the rotation angle calculator 26 may calculate a variance A of the slope value a indicated by the plurality of pieces of the slope data in the slope list La (step S104). In a case where the variance A is equal to or greater than a threshold Ath ("N" in step S105), the flow may be terminated. That is, in the case where the variance A is equal to or greater than the threshold Ath, the slope value a varies, and the precision is insufficient. Therefore, the flow may be terminated without calculating the rotation angle θ.

In a case where the variance A is smaller than the threshold Ath (A<Ath) ("Y" in step S105), the rotation angle calculator 26 may calculate an average of the slope values a, i.e., a slope average AVG, indicated by the plurality of pieces of the slope data in the slope list La (step S106).

Thus, the rotation angle calculator 26 may calculate the amount of angular change Δθ from the current rotation angle θ, on the basis of the slope average AVG, to calculate the rotation angle θ (step S107). In one example, the rotation angle calculator 26 may set polarity of the amount of angular change Δθ on the basis of polarity of the slope average AVG. Moreover, the rotation angle calculator 26 may allow an absolute value of the amount of angular change Δθ to be greater, as an absolute value of the slope average AVG is greater. In one example, in a case where the absolute value of the slope average AVG is a first value, the rotation angle calculator 26 may set the absolute value of the amount of angular change Δθ at a second value. In a case where the absolute value of the slope average AVG is a third value greater than the first value, the rotation angle calculator 26 may set the absolute value of the amount of angular change Δθ at a fourth value greater than the second value. Thus, the rotation angle calculator 26 may add the amount of angular change Δθ to the current rotation angle θ, to calculate the rotation angle θ.

In this way, the rotation controller 24 may calculate the rotation angle θ on the basis of the data regarding the corresponding point CP, to generate the rotation control data CTL including data regarding the rotation angle θ calculated. The rotation processor 21 may rotate the left image PL and the right image PR by the rotation angle θ on the basis of the rotation control data CTL, to generate the left image PL1 and the right image PR1. The image processing device 1 may repeat such processing.

Figure 8:
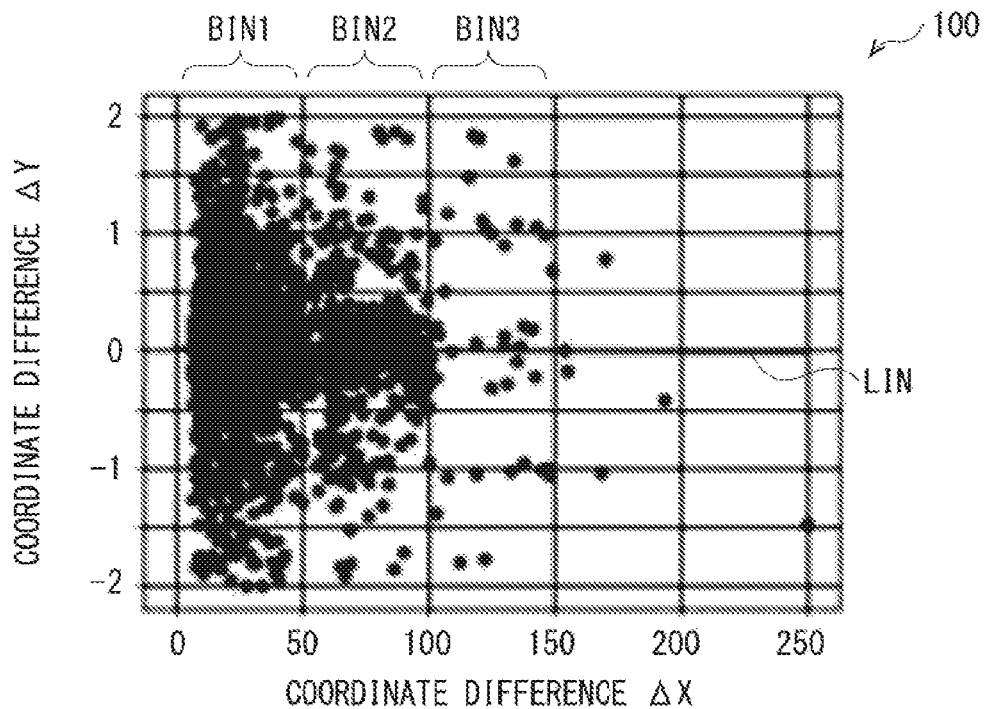
FIG. 8 illustrates an operation example of the rotation controller illustrated in FIG. 1.

Allowing the image processing device 1 to repeat such processing causes the rotation angle θ to be negative-feedback controlled. This negative-feedback operation causes the slope value a of the approximate line LIN on the plot 100 to become gradually smaller. Finally, for example, as illustrated in FIG. 8, the slope value a of the approximate line LIN is brought to substantially zero (0). As a result, as illustrated in FIG. 4, the rotation angle θ is adjusted to an angle at which the positions in the vertical direction, i.e., the Y direction, of the images of the preceding vehicle 90 in the left image PL1 and the right image PR1 are brought substantially into registry. This makes it possible for the parallax image generator 22 to detect the corresponding point CP on the basis of the left image PL1 and the right image PR1 as described. As a result, in the image processing device 1, it is possible to enhance the precision of the parallax image PD.

As described, in the image processing device 1, the rotation processing is made, to generate the left image PL1 and the right image PR1. The rotation processing includes rotating the left image PL and the right mage PR included in the stereo image PIC. On the basis of the left image PL1 and the right image PR1, the left image point CPL in the left image PL1 and the right image point CPR in the right image PR1 are calculated. The left image point CPL in the left image PL1 and the right image point CPR in the right image PR1 correspond to each other. This makes it possible to bring substantially into registry the positions in the vertical direction, i.e., the Y direction, of the images of, for example, the preceding vehicle 90 in the left image PL1 and the right image PR1 even in the case where the left camera 11L and the right camera 11R are disposed in the relatively deviated relation in the heightwise direction. Hence, it is possible to detect the corresponding point CP on the basis of the left image PL1 and the right image PR1. This results in enhanced precision of the parallax image PD.

Moreover, in the image processing device 1, the coordinate point P is obtained that indicates the relation of the coordinate difference $\Delta X$ in the horizontal direction, i.e., the X direction, and the coordinate difference $\Delta Y$ in the vertical direction, i.e., the Y direction, between the coordinate position of the left image point CPL in the left image PL1 and the coordinate position of the right image point CPR in the right image PR1. On the basis of the coordinate point P, the amount of angular change $\Delta \theta$ in the rotation angle $\theta$ in the rotation processing is calculated. Hence, it is possible to calculate the rotation angle $\theta$ in a simple method. For example, there may be a possible alternative in which an amount of relative deviation in the heightwise direction of the left camera 11L and the right camera 11R is obtained on the basis of the corresponding point CP, with the use of epipolar geometry, to make a correction of the left image PL and the right image PR on the basis of the amount of deviation. However, in this case, for example, the algorism may become complicated, causing possibility of long-time processing. In contrast, in the image processing device 1, calculation is made on a two-dimensional plane with the use of the coordinate difference $\Delta X$ and the coordinate difference $\Delta Y$, to calculate the amount of angular change $\Delta \theta$ in the rotation angle $\theta$. Hence, it is possible to calculate the rotation angle $\theta$ in the rotation processing in the simple method.

Moreover, in the image processing device 1, the amount of angular change $\Delta \theta$ may be calculated on the basis of the predetermined number of the slope values a out of the slope values a obtained each time the approximate line LIN is updated. In particular, in the image processing device 1, the variance A of the predetermined number of the slope values a may be calculated. In the case where the variance A is smaller than the threshold Ath, the amount of angular change $\Delta \theta$ may be calculated on the basis of the slope average AVG of the predetermined number of the slope values a. Hence, in the image processing device 1, in the case where the slope value a varies, no calculation of the amount of angular change $\Delta \theta$ is made. Hence, it is possible to calculate the rotation angle $\theta$ with high precision, resulting in the enhanced precision of the parallax image PD.

Effects

As described, in the embodiment, the rotation processing is made, to generate the left image PL1 and the right image PR1. The rotation processing includes rotating the left image PL and the right mage PR included in the stereo image. On the basis of the left image PL1 and the right image PR1, the left image point in the left image PL1 and the right image point in the right image PR1 are calculated. The left image point in the left image PL1 and the right image point in the right image PR1 correspond to each other. Hence, it is possible to enhance the precision of the parallax image.

In the embodiment, the coordinate point is obtained that indicates the relation of the coordinate difference in the horizontal direction and the coordinate difference in the vertical direction, between the coordinate position of the left image point in the left image PL1 and the coordinate position of the right image point in the right image PR1. On the basis of the coordinate point, the amount of angular change in the rotation angle in the rotation processing is calculated. Hence, it is possible to calculate the rotation angle in a simple method.

In the embodiment, the amount of angular change may be calculated on the basis of the predetermined number of the slope values out of the slope values obtained each time the approximate line is updated. Hence, it is possible to enhance the precision of the parallax image.

Although some preferred embodiments of the technology are described above by way of example with reference to the accompanying drawings, the technology is by no means limited to the embodiments described above. It should be appreciated that modifications and alterations may be made by persons skilled in the art without departing from the scope as defined by the appended claims.

For example, in the forgoing embodiments, the stereo camera 11 captures the image frontward of the vehicle 10, but this is non-limiting. The stereo camera 11 may capture an image sideward or rearward of the vehicle 10.

It is to be noted that the effects described in the specification are by no means limitative but explanatory or exemplary. The technology according to the disclosure may produce other effects, together with the forgoing effects, or instead of the forgoing effects.

The processor 20 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the processor 20. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the processor 20 illustrated in FIG. 1.

It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

The invention claimed is:

1. An image processing device, comprising:
 a rotation processor configured to make rotation processing including rotating a first left image and a first right image included in a stereo image, to generate a second left image and a second right image;

a parallax image generator configured to calculate, on a basis of the second left image and the second right image, a left image point in the second left image and a right image point in the second right image, to generate a parallax image, the left image point and the right image point corresponding to each other; and a rotation controller configured to obtain a coordinate point, to calculate, on a basis of the coordinate point, an amount of angular change in a rotation angle in the rotation processing, the coordinate point indicating relation of a first positional difference in a horizontal direction and a second positional difference in a vertical direction, between a first position and a second position, the first position being a position of the left image point in the second left image, and the second position being a position of the right image point in the second right image, wherein the rotation controller is configured to obtain the coordinate point on a basis of each of a plurality of the stereo images, and set the amount of angular change on a basis of a plurality of the coordinate points, and wherein the rotation controller is configured to calculate an approximate line to the plurality of the coordinate points, with the plurality of the coordinate points arranged relative to a first direction and a second direction, the first direction referring to the first positional difference, and the second direction referring to the second positional difference, to calculate the amount of angular change on a basis of a slope value of the approximate line.

2. The image processing device according to claim 1, wherein the rotation controller is configured to calculate the amount of angular change on a basis of predetermined number of the slope values out of the slope values obtained each time the approximate line is calculated.

3. The image processing device according to claim 2, wherein the rotation controller is configured to calculate a variance of the predetermined number of the slope values, and on a condition that the variance is smaller than a predetermined threshold, the rotation controller is configured to calculate the amount of angular change on a basis of a slope average that is an average of the predetermined number of the slope values.

4. The image processing device according to claim 3, wherein the rotation controller is configured to set polarity of the amount of angular change on a basis of polarity of the slope average.

5. The image processing device according to claim 3, wherein on a condition that an absolute value of the slope average is a first value, the rotation controller is configured to set an absolute value of the amount of angular change at a second value, and on a condition that the absolute value of the slope average is a third value greater than the first value, the rotation controller is configured to set the absolute value of the amount of angular change at a fourth value greater than the second value.

6. The image processing device according to claim 4, wherein on a condition that an absolute value of the slope average is a first value, the rotation controller is configured to set an absolute value of the amount of angular change at a second value, and on a condition that the absolute value of the slope average is a third value greater than the first value, the rotation controller is configured to set the absolute value of the amount of angular change at a fourth value greater than the second value.

7. An image processing device, comprising circuitry configured to:

make rotation processing including rotating a first left image and a first right image included in a stereo image, to generate a second left image and a second right image;

calculate, on a basis of the second left image and the second right image, a left image point in the second left image and a right image point in the second right image, to generate a parallax image, the left image point and the right image point corresponding to each other; and obtain a coordinate point, to calculate, on a basis of the coordinate point, an amount of angular change in a rotation angle in the rotation processing, the coordinate point indicating relation of a first positional difference in a horizontal direction and a second positional difference in a vertical direction, between a first position and a second position, the first position being a position of the left image point in the second left image, and the second position being a position of the right image point in the second right image, wherein the circuitry is configured to obtain the coordinate point on a basis of each of a plurality of the stereo images, and set the amount of angular change on a basis of a plurality of the coordinate points, and wherein the circuitry is configured to calculate an approximate line to the plurality of the coordinate points, with the plurality of the coordinate points arranged relative to a first direction and a second direction, the first direction referring to the first positional difference, and the second direction referring to the second positional difference, to calculate the amount of angular change on a basis of a slope value of the approximate line.

\* \* \* \* \*